July 20, 1926.

W. T. S. MONTGOMERY

AIR FLOW REGULATOR

Filed August 24, 1925      2 Sheets-Sheet 1

1,592,956

W. T. S. Montgomery, INVENTOR.

BY

Geo. F. Kimmel. ATTORNEY.

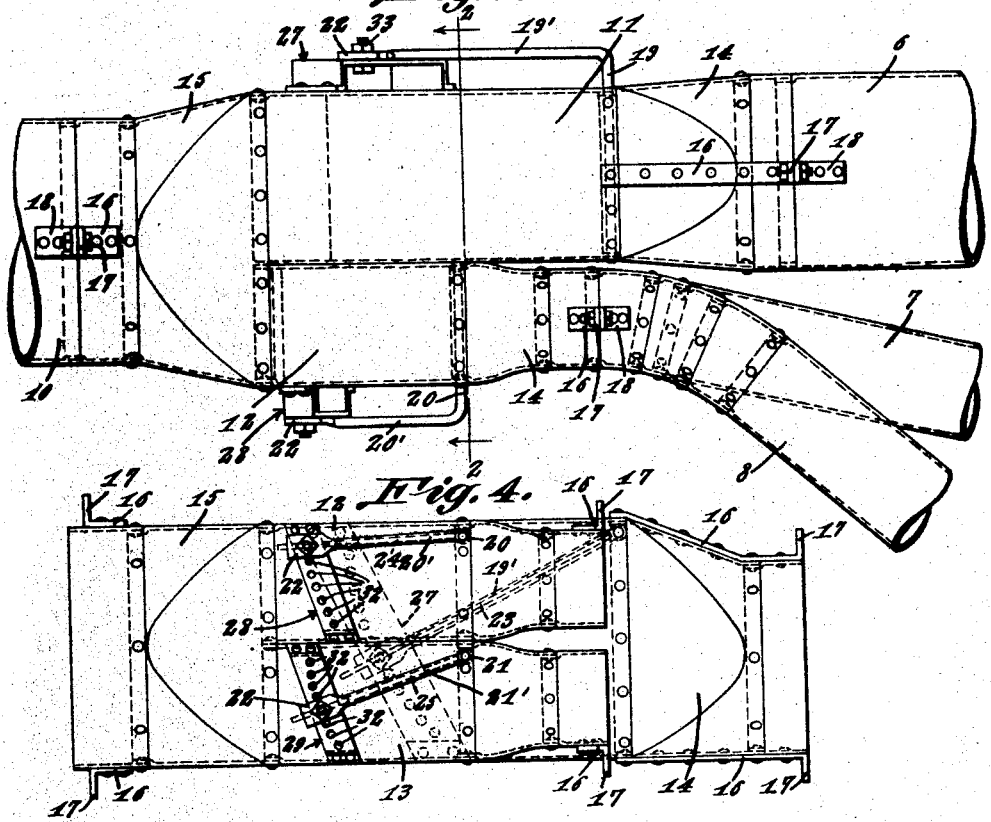

Patented July 20, 1926.

1,592,956

UNITED STATES PATENT OFFICE.

WILLIAM T. S. MONTGOMERY, OF JACKSONVILLE, FLORIDA.

AIR-FLOW REGULATOR.

Application filed August 24, 1925. Serial No. 52,078.

This invention relates to air flow regulators particularly adapted for use in sub-main and branch pipe lines of pneumatic conveyor systems.

The suction flow regulator structure embodying this invention is designed for use in connection with the main pipe line suction regulating device embodying the subject matter of my application Serial Number 35,495, but it is to be understood that this regulator is not confined to use only with said regulating device but may be used in any pipe line system to which it is applicable.

The primary object of this invention is the provision, in a manner as hereinafter set forth, of a regulating device for maintaining a proper draft through a pipe line and so designed that upon closing down the regulator to diminish the draft through the pipe the current of air will be gradually decreased instead of being stopped or partially stopped abruptly.

The further object of the invention is the provision, in a manner as hereinafter set forth, of such a regulator having means whereby the same may be set in any one of a plurality of positions after the proper draft has been established in the pipe line by the manipulation of the regulator and permanently fixed in this set position until such time as it may be necessary or advisable to change the flow of air through the pipe.

A further and final object of this invention is the provision, in a manner as hereinafter set forth, of a regulating device of simple construction, strong and durable, easily and quickly adjusted and set in the desired position, and inexpensive to manufacture and set up.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claim.

In the drawings:—

Figure 1 shows conventionally the lay out of the main and sub-main pipes of a portion of a pneumatic conveyor system leading from a blower and having in one of the branch pipes of the sub-main pipe the regulating devices embodying this present invention. There is also shown conventionally in this figure, in the main pipe line, the structure regulating device embodying the subject matter of my application above referred to.

Figure 3 is a top plan view of a portion of a sub-main pipe and branch pipes leading therefrom showing the regulator devices embodying this invention interposed therebetween.

Figure 4 is a view showing in side elevation a pair of the regulators controlling two small branch pipes and, Figure 5 shows in side elevation a regulator controlling a larger branch pipe line.

Figure 1:
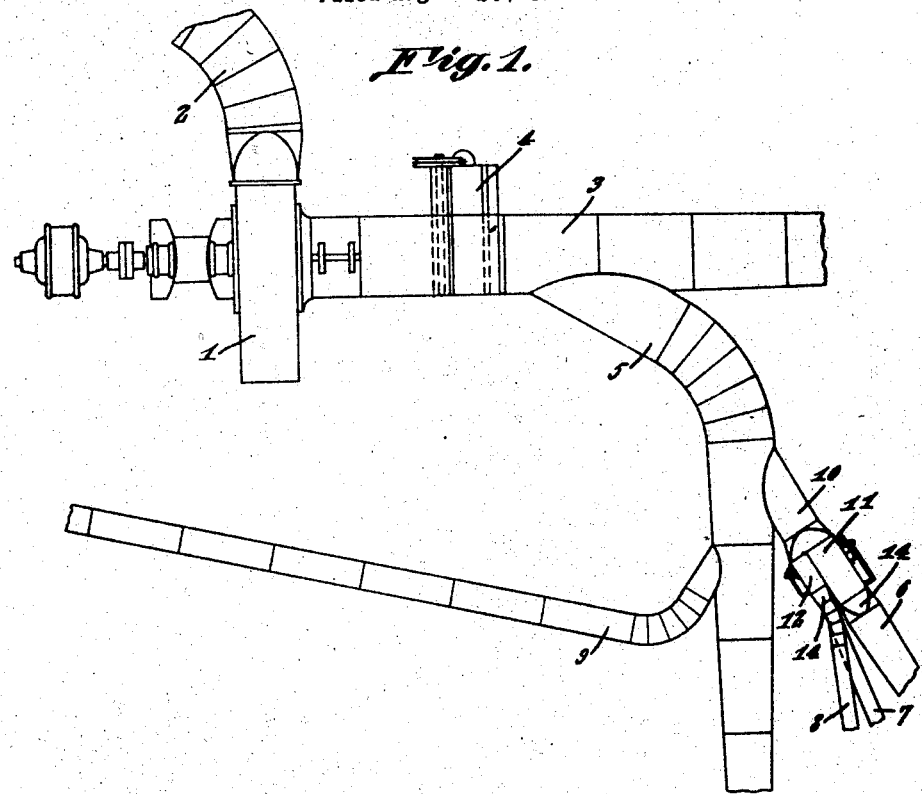
Figure 2:
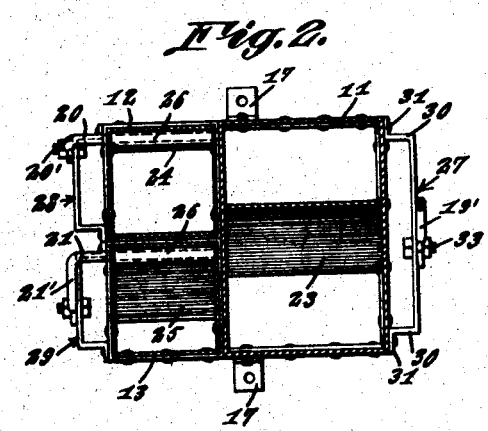
Figure 2 is a transverse section taken upon the line 2—2 of Figure 3 of the drawings.

Referring now to the drawings in detail wherein like numerals of reference indicate corresponding parts throughout the several views, there is indicated conventionally in Figure 1 a small portion of a pneumatic conveyor system, showing a blower 1, a lead-off pipe 2 connected thereto and the main pipe line of the system indicated at 3. Installed in this main pipe line is the automatic vacuum regulator 4 which embodies the subject matter of my other application above referred to.

Leading into the main pipe 3 is a sub-main pipe 5 into which the smaller branch pipes 6, 7, 8 and 9 respectively lead. The device embodying this invention is designed to control the flow of air through these branch pipes and the regulator is usually installed in the branch pipe adjacent the sub-main pipe as shown in Figure 1. In this Figure there is shown a group of three branch pipes 6, 7 and 8 respectively merging into a common reducing section 10 which section opens directly into the sub-main pipe 5 as shown.

The regulators are contained in relatively long rectangular casings 11, 12 and 13 respectively, one end of each casing having connected thereto a square-to-round transformer 14 by means of which the circular pipes 6, 7 and 8 are connected thereto, and the other end of each of the casings is secured within the square end of the square-to-round transformer 15 which is common to all of the casings 11, 12 and 13 to convey material passing therethrough into the circular connecting pipe 10 through which the material is led into the sub-main and then into the main pipe of the system.

Although there has been shown in the present drawings, three rectangular compartments namely the compartments 11, 12 and 13, it is to be understood that any number of these compartments may be placed together to merge the contents of a number of branch pipes, for four of the smaller compartments may be used to merge the contents of four branch pipes or two of the larger compartments 11 may be used side by side for the same purpose, or any other number or combination of these compartments may be used as desired.

As is clearly shown the square-to-round transformer members 14 and 15 are designed to connect up pipes or compartments having square ends with ends of pipes of circular cross section and one end of these transformers is rectangular while the other end thereof is round as is shown. Each of the transformers 14 and 15 is provided with the angle securing iron 16 which irons have one portion thereof riveted to the transformer while the other portion 17 thereof extends at right angles outwardly and is designed to abut and be secured to corresponding upstanding ends 18 of angle irons carried upon the pipe sections.

Extending transversely through each of the compartments 11, 12 and 13, against the underside of the top thereof and at that end of each compartment to which the branch pipe is attached, are shafts 19, 20 and 21 respectively each revolubly mounted in the side walls of its respective compartment. The outer portions of each of these shafts 19, 20 and 21 is turned at right angles to provide the actuating levers 19', 20' and 21' as is shown, and the terminal end of each of these levers is flattened as indicated at 22 and is provided with an aperture therethrough. As is shown the levers extend along the sides of the compartments and are spaced therefrom.

In each of the compartments 11, 12 and 13 respectively there are mounted draft gates or valve blades 23, 24 and 25 respectively across one end of each of which gates is formed a sleeve 26 through which one of the shafts 19, 20 or 21 passes. These sleeves are secured to their respective shafts and when the lever members attached to the shafts are swung to revolve the shafts the gates are raised or lowered in their compartments to open the same to allow a full blast of air to pass therethrough or to close the same to retard the passage of the air and conveyed matter passing therethrough.

As is of course understood the draft of air passes through the compartments 11, 12 and 13 from the branch pipes 6, 7 and 8 to and through the connection 10 and due to the manner in which the gates 23, 24 and 25 are mounted in the compartments, when the gates are closed the draft of air is gradually reduced and no obstruction is offered to cause the material passing therethrough to become clogged against the gate. If the gate were facing the other direction or its free edge facing the current of air the air passing through the pipe and the material carried thereby would pocket between the gate and the top of the compartment and thus cause trouble through the congestion of the pipe line.

Mounted at an inclination across the outer side of each of the compartments 11, 12 and 13, are bracket plates 27, 28 and 29 respectively each of which plates has its ends inturned as at 30 and again turned outwardly as at 31 to set up the supporting feet through which feet 31 bolts or rivet members, or other appropriate securing means are passed to secure the plate to the side of its respective casing.

Each of the bracket plates 27, 28 and 29 is provided with an arcuate series of closely spaced apertures 32 the arc of each of the series of apertures being struck from the point about which the shafts of the respective casings revolve.

The flattened ends 22 of the adjacent levers are adapted to move over the face of the apertured plate, when the gates controlled by the arms and shafts attached thereto are being set for regulating the current of air passing through the branch pipe lines.

It will be noted that the lever arms are parallel with the side edges of the blades or draft gates which they control and because of this the position in which the draft gates are set can be readily determined for the angle at which the lever arm is set will indicate the angle assumed by the blade or draft gate within the compartment.

When the draft gate is set at the desired angle a securing bolt 33 is passed through the flattened end 22 of the lever and through one of the apertures 32 in the adjacent plate thus securing the draft gate in set position.

From the foregoing description it will be readily seen that there has been provided a draft regulating gate device for pneumatic conveyor branch lines which is of simple construction and at the same time strong, durable and efficient for the purpose intended.

Having thus described my invention what I claim is:—

In a regulator of the character and for the purpose set forth, a casing through which a current of air is designed to pass, a shaft mounted transversely of said casing adjacent that end at which the air current enters, a valve blade carried by said shaft and adapted to move in the casing to control the passage of air therethrough, a control lever formed integral at one end with one end of said shaft and extending across one side of said casing, a plate member secured to the side of the casing and having a plurality of apertures therethrough, and means adapted to engage in any one of said apertures and connect to the free end of said lever for securing the lever in any one of a plurality of positions.

In testimony whereof, I affix my signature hereto.

WILLIAM T. S. MONTGOMERY.